(12) United States Patent
Konchan et al.

(10) Patent No.: US 9,067,617 B2
(45) Date of Patent: Jun. 30, 2015

(54) WHEEL TURN INITIATOR

(71) Applicant: GM Global Technology Operations LLC, Detroit, MI (US)

(72) Inventors: Jeffrey L. Konchan, Romeo, MI (US); Hesham A. Ezzat, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/087,279

(22) Filed: Nov. 22, 2013

(65) Prior Publication Data

US 2015/0000995 A1   Jan. 1, 2015

Related U.S. Application Data

(60) Provisional application No. 61/840,754, filed on Jun. 28, 2013.

(51) Int. Cl.
*B62D 7/22* (2006.01)
*B62D 9/00* (2006.01)
*B62D 21/15* (2006.01)
*B62D 25/08* (2006.01)

(52) U.S. Cl.
CPC ............... *B62D 9/00* (2013.01); *B62D 21/152* (2013.01); *B62D 25/082* (2013.01)

(58) Field of Classification Search
CPC B60R 19/34; B60R 2021/0023; B62D 21/15; B62D 21/152
USPC ........... 296/187.1, 187.09; 293/150; 280/311, 280/784; 180/232, 274, 280
See application file for complete search history.

(56) References Cited

U.S. PATENT DOCUMENTS

| | | | |
|---|---|---|---|
| 5,275,436 A * | 1/1994 | Pomero | 280/784 |
| 6,511,119 B2 * | 1/2003 | Takase et al. | 296/187.09 |
| 6,866,115 B2 * | 3/2005 | Miyasaka | 180/311 |
| 6,994,374 B2 * | 2/2006 | Miyasaka | 280/784 |
| 7,819,218 B2 * | 10/2010 | Eichberger et al. | 180/274 |
| 7,926,847 B2 * | 4/2011 | Auer et al. | 280/784 |
| 8,353,380 B2 * | 1/2013 | Schonberger et al. | 180/274 |
| 8,398,154 B1 * | 3/2013 | Nusier et al. | 296/187.1 |
| 8,544,589 B1 * | 10/2013 | Rupp et al. | 180/274 |
| 2013/0257028 A1 * | 10/2013 | Kuwabara et al. | 280/784 |
| 2014/0091595 A1 * | 4/2014 | Ramoutar et al. | 296/187.09 |
| 2014/0159423 A1 * | 6/2014 | Chang | 296/187.09 |

* cited by examiner

*Primary Examiner* — Paul N Dickson
*Assistant Examiner* — Robert A Coker
(74) *Attorney, Agent, or Firm* — Quinn Law Group, PLLC

(57) ABSTRACT

A vehicle includes a vehicle frame, a wheel and tire assembly, and a wheel turn initiator system. The wheel and tire assembly is mounted with respect to the vehicle frame and is selectively rotatable about a generally vertical axis. The wheel turn initiator system is mounted with respect to the frame and has a member. The wheel turn initiator system is configured such that an external force applied to the front end of the vehicle causes the member to engage the wheel and tire assembly and thereby cause the wheel and tire assembly to rotate about the axis.

13 Claims, 8 Drawing Sheets

US 9,067,617 B2

WHEEL TURN INITIATOR

CROSS-REFERENCE TO RELATED APPLICATION

This application claims the benefit of U.S. Provisional Patent Application No. 61/840,754, filed Jun. 28, 2013, and which is hereby incorporated by reference in its entirety.

TECHNICAL FIELD

This disclosure relates to vehicle structural systems.

BACKGROUND

Vehicles typically include a frame with wheels rotatably mounted thereto. The wheels are contained in wheel wells. A bumper beam is typically connected to the frame to receive external forces at the front end of the vehicle.

SUMMARY

A vehicle includes a vehicle frame, a front wheel and tire assembly, and a wheel turn initiator system. The wheel and tire assembly is mounted with respect to the vehicle frame and is selectively rotatable about a generally vertical axis. The wheel turn initiator system is mounted with respect to the frame and has a member. The wheel turn initiator system is configured such that an external force applied to the front end of the vehicle causes the member to engage the wheel and tire assembly and thereby cause the wheel and tire assembly to rotate about the axis.

The movement of the wheel and tire assembly caused by the wheel turn initiator may assist with management of the external force, and may also alter the direction of the vehicle travel so that the vehicle moves away from the source of the external force. A corresponding method is also provided.

The above features and advantages and other features and advantages of the present disclosure are readily apparent from the following detailed description of the best modes for carrying out the disclosure when taken in connection with the accompanying drawings.

DETAILED DESCRIPTION

Figure 1:
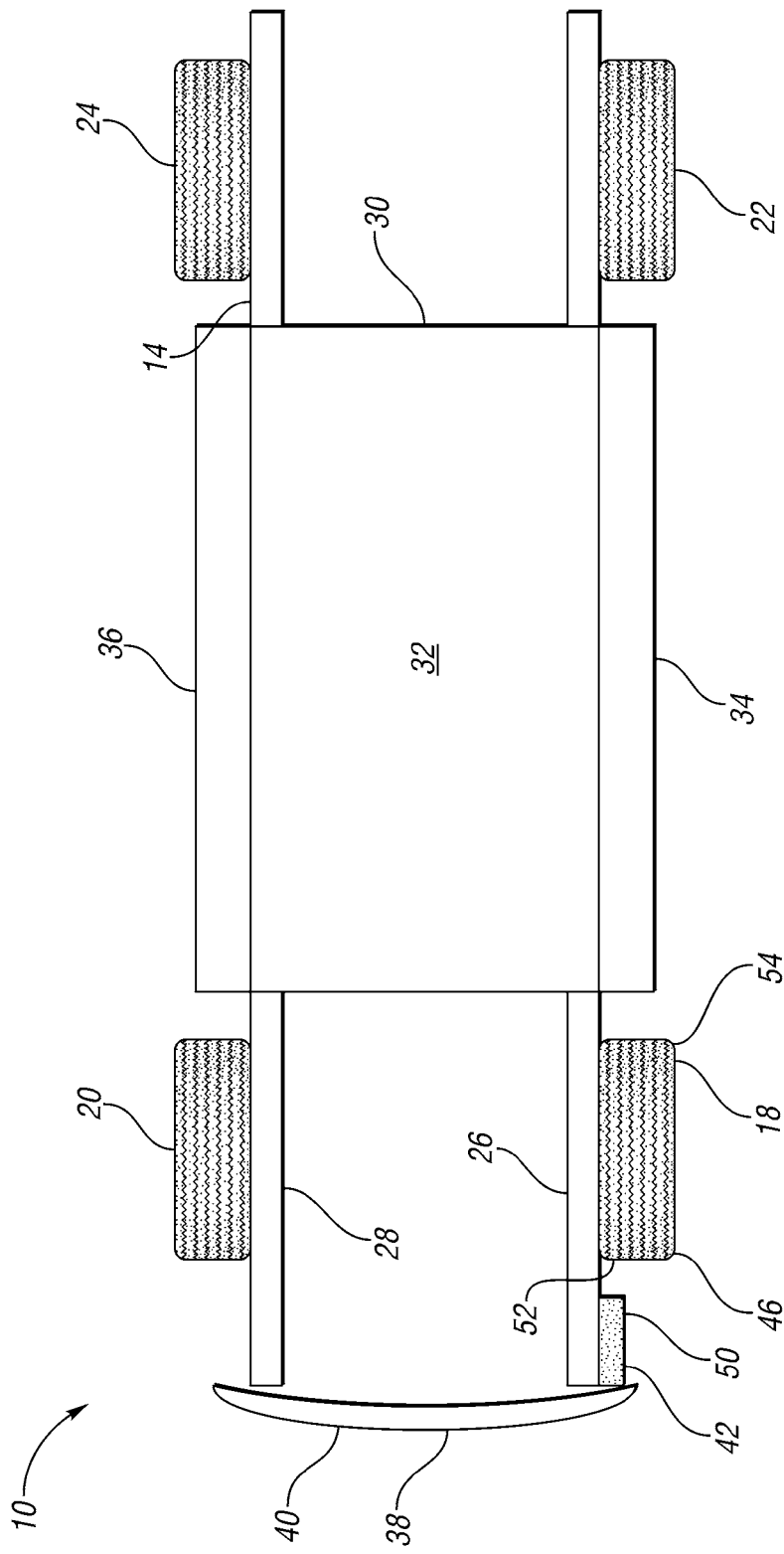
FIG. 1 is a schematic, top view of a vehicle including a front wheel and tire assembly and a wheel turn initiator prior to application of an offset external force to the front end of the vehicle.

Referring to FIG. 1, a vehicle 10 includes a vehicle frame 14. Two front wheel and tire assemblies 18, 20 and two rear wheel and tire assemblies 22, 24 are rotatably mounted with respect to the frame 14. The frame 14 includes two front rails 26, 28. The vehicle 10 also includes a body 30 that defines an interior compartment 32. It should be noted that, within the scope of the claims, the body 30 and the frame 14 may be integral (i.e., "unibody" or "body-frame integral"), or the frame 14 may be a separate unit that is attached to the body 30 (i.e., body-on-frame construction). The body 30 includes rocker panels 34, 36, each of which extends along a respective lower outboard portion of the body 30 below the interior compartment 32.

Each of the front wheel and tire assemblies 18, 20 is mounted with respect to the frame 14 via a respective steering knuckle pivot (not shown in FIG. 1) that permits selective rotation of each wheel and tire assembly 18, 20 about a respective vertical axis, thereby enabling the steering angle of the wheel and tire assemblies 18, 20 to vary in order to control the direction of movement of the vehicle 10. The vehicle 10 also includes a front end 38, which, in the embodiment shown in FIG. 1, is defined in part by a front bumper beam 40 operatively connected to the rails 26, 28. Other structural members may define the front end 38, such as a front fascia, etc.

The vehicle 10 also includes a wheel turn initiator system 42 that is mounted with respect to the frame 14, and that is positioned and configured to urge the wheel and tire assembly 18 to rotate about its vertical axis such that the forward portion 46 of the wheel and tire assembly 18 moves inboard (i.e., toward the vehicle centerline) in response to an external force (shown at 48 in FIG. 2) exerted on the front end 38 of the vehicle 10.

Figure 2:
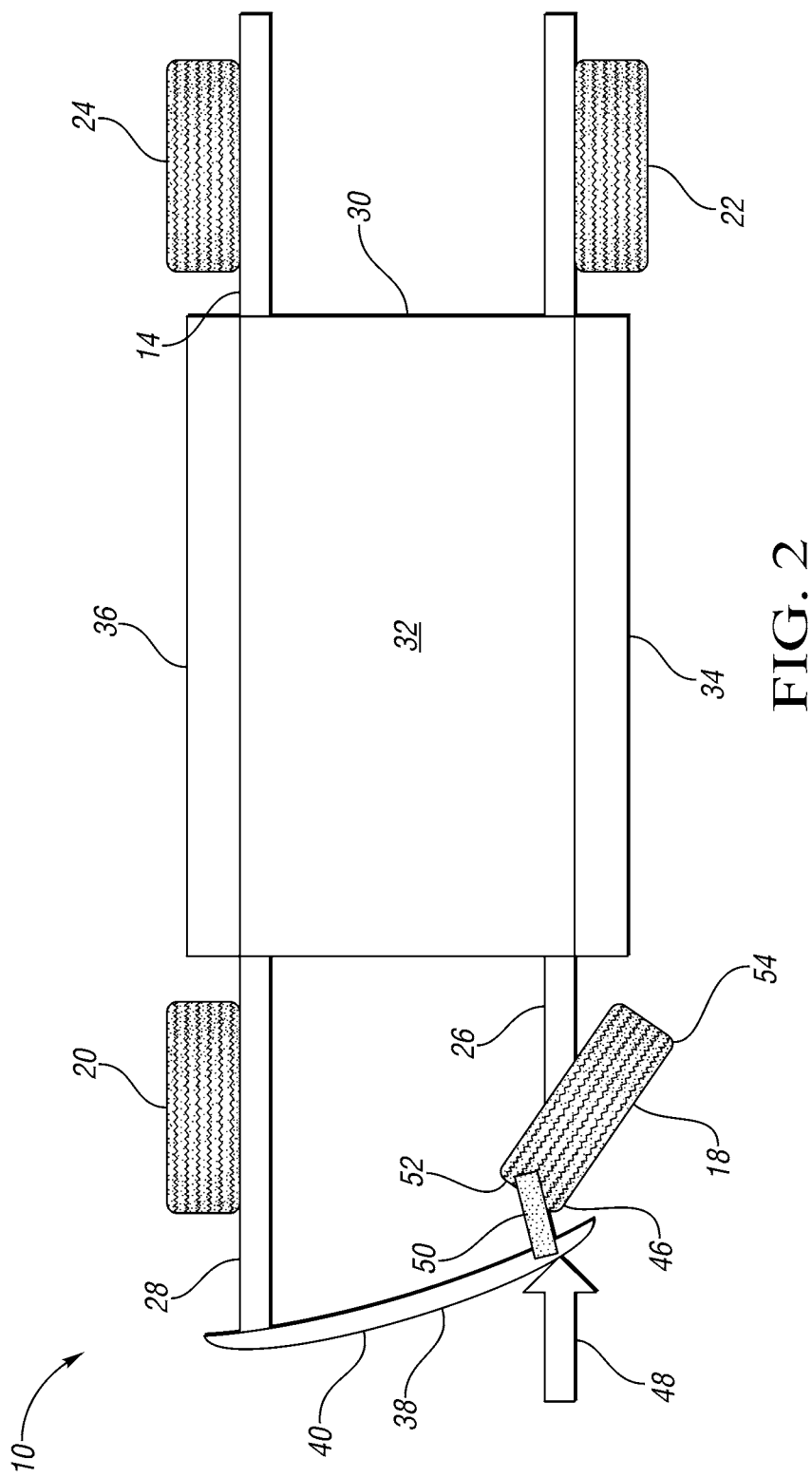
FIG. 2 is a schematic, top view of the vehicle of FIG. 1 after the application of the offset external force.

More specifically, in the embodiment of FIG. 1, the initiator system 42 includes a member 50 that is positioned such that, when the external force 48 is above a predetermined magnitude, the external force 48 drives the member 50 into contact with the inboard region 52 of the forward portion 46 of the wheel and tire assembly 18. FIG. 2 schematically depicts the vehicle 10 after deformation caused by the external force 48. Referring to FIG. 2, wherein like reference numbers refer to like components from FIG. 1, the external force 48 has moved the member 50 into contact with the inboard region 52 of the forward portion 46 of the wheel and tire assembly 18, thereby rotating the forward portion 46 inboard and, correspondingly, moving the rearward portion 54 of the assembly 18 outboard.

Figure 3:
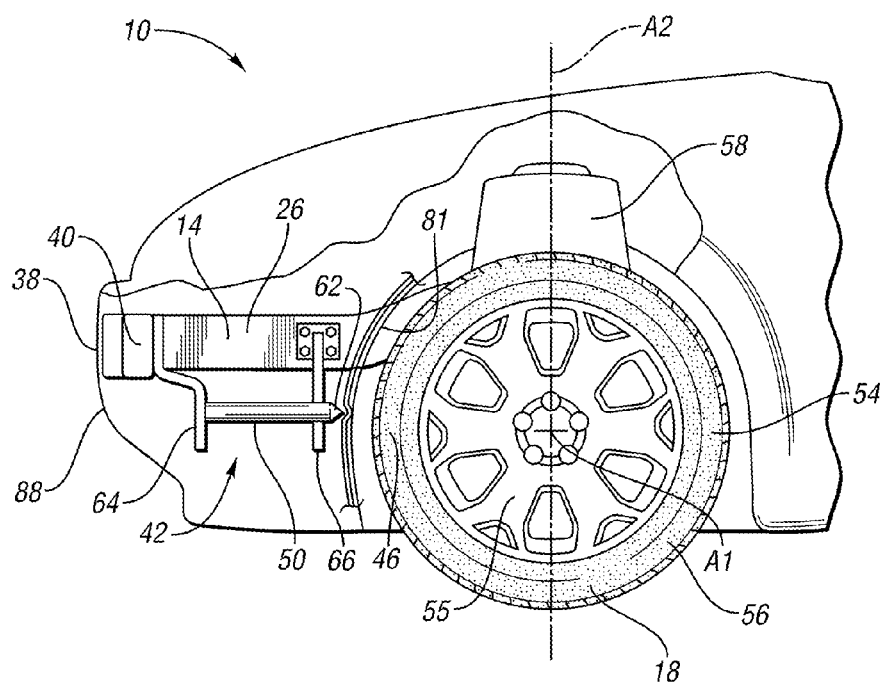
FIG. 3 is a schematic, side view of a portion of the vehicle of FIG. 1.
Figure 4:
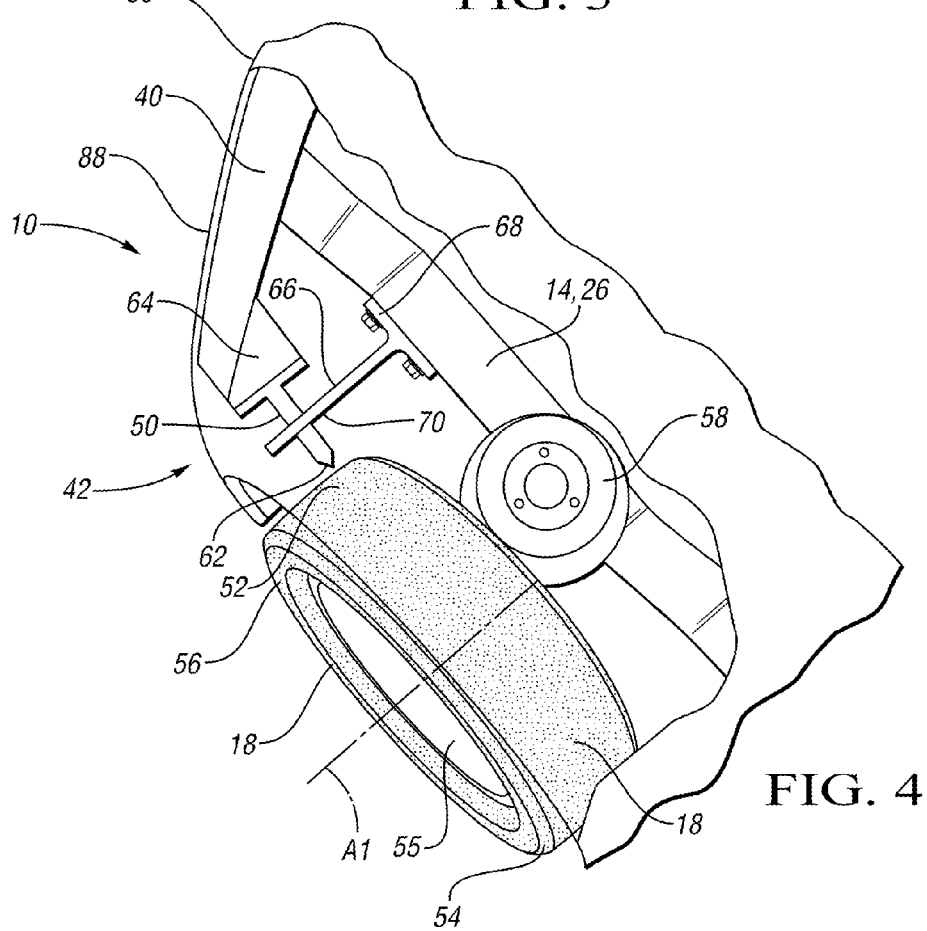
FIG. 4 is a schematic, top view of a portion of the vehicle of FIG. 1.

Referring to FIGS. 3 and 4, wherein like reference numbers refer to like components from FIGS. 1 and 2, the wheel and tire assembly 18 includes a wheel 55 and a tire 56 mounted thereto. The wheel and tire assembly 18 is rotatable about a horizontal, transverse axis A1 for rolling on the ground, and is also selectively rotatable about a generally vertical axis A2 to selectively vary the steering angle of the wheel and tire assembly 18, and thereby change the direction of travel of the vehicle 10. The wheel and tire assembly 18 is mounted with respect to the frame 14 by a suspension system, which is at least partially disposed within a shock tower 58.

Figure 5:
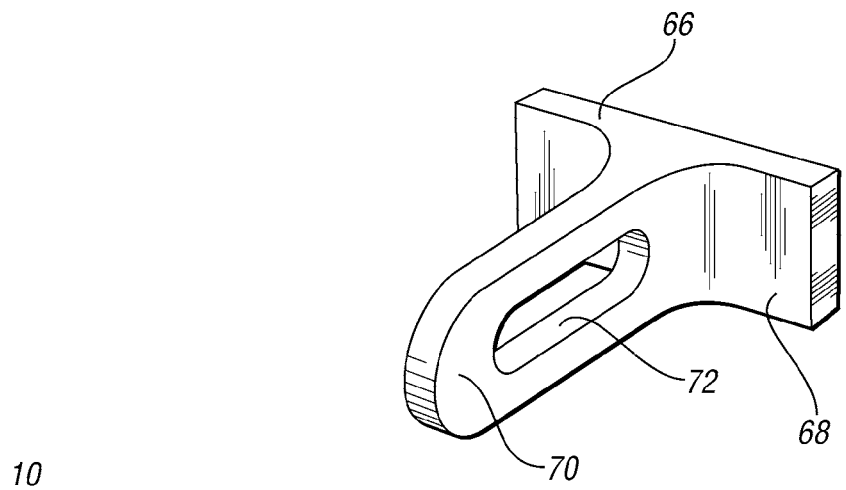
FIG. 5 is a schematic, perspective view of a bracket of the wheel turn initiator of FIGS. 3 and 4.

In the embodiment depicted, rail 26 is a lower rail, and the frame 14 may also include an upper rail (not shown). The wheel turn initiator includes member 50, which is a rod having a pointed or chamfered end 62; the end 62 is sufficiently sharp to embed itself into the tire 56 as the member 50 is thrust into the tire 56, as shown in FIG. 2. The member 50 is mounted to a mounting bracket 64, which in turn is mounted to the extended bumper beam 40, such as by welds or bolts such that the bumper beam 40 transfers loads to the bracket 64. The initiator system 42 also includes a guide bracket 66. Referring to FIGS. 4 and 5, the guide bracket 66 includes a base portion 68 that is mounted to the frame rail 26, and a cantilevered guide portion 70 that extends perpendicularly from the base portion 68 and transversely with respect to the vehicle 10. The guide portion 70 defines an elongated slot 72 that extends transversely. The member 50 extends through the slot 72. The slot 72 is sized and shaped to prevent vertical movement of the member 50, but permit transverse movement of the member 50.

Accordingly, the guide bracket 66 maintains the member 50 at approximately the same height as the center of the wheel and tire assembly 18 (i.e., at the height of axis A1) to maximize the engagement of the member 50 with the tread of the tire 56 after the application of the external force, while also permitting transverse movement of the member 50 as the member 50 pushes the forward portion 46 of the wheel and tire assembly 18 inboard.

Figure 6:
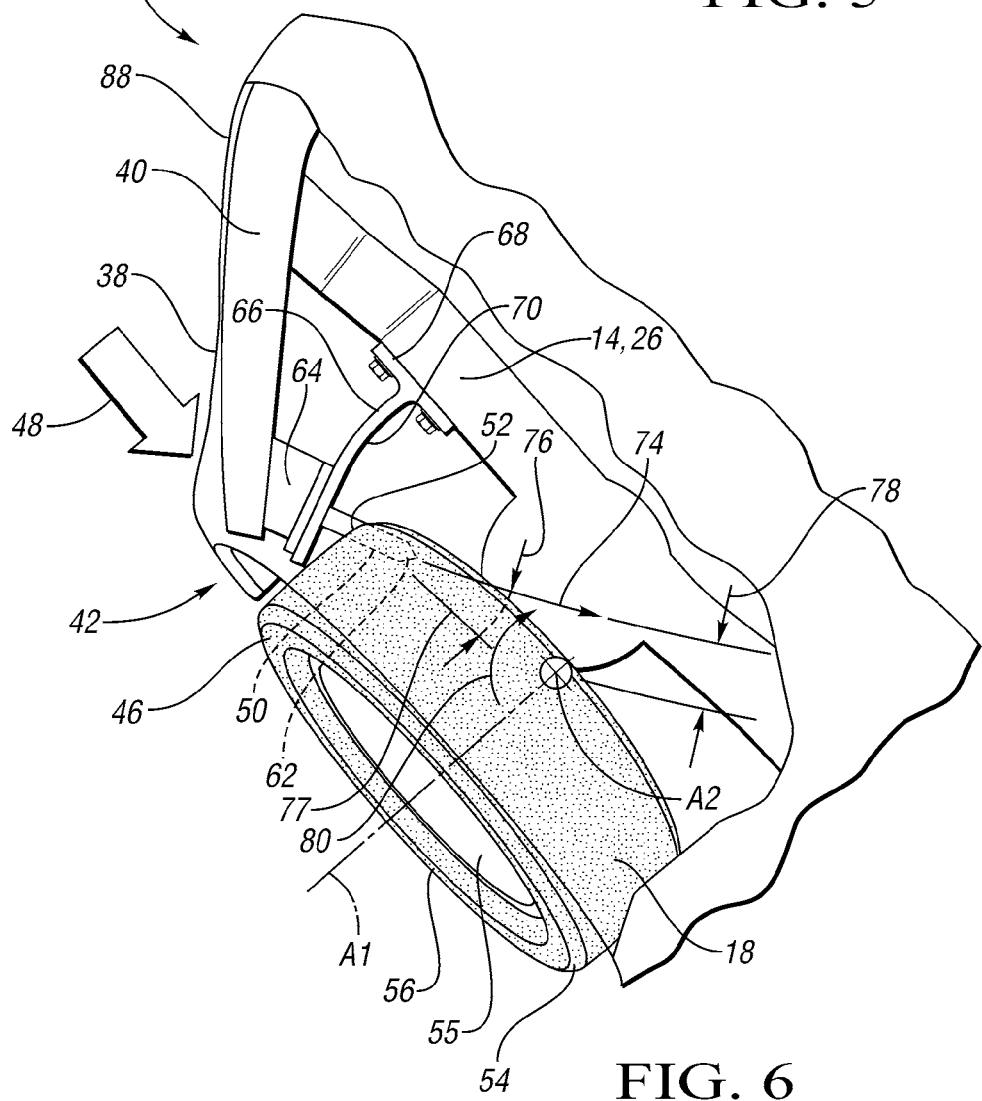
FIG. 6 is a schematic, top view of the portion of the vehicle of FIG. 1 during application of the external force.

FIGS. 3 and 4 depict the vehicle 10 prior to the application of the external force (shown at 48 in FIG. 2). Prior to the application of the external force, the member 50 is sufficiently spaced forward of the tire 56 such that the member 50 does not interfere with normal operation of the tire 56 as the wheel and tire assembly 18 is rotated about axis A2 for steering. FIG. 6 schematically depicts the vehicle 10 during the application of the external force 48 to the front end 38 of the vehicle 10. Referring to FIG. 6, wherein like reference numbers refer to like components from FIGS. 1-5, the external force 48, applied to the bumper beam 40 via the front fascia 88, has been transferred by the bumper beam 40 to the member 50 via the bracket 64, causing the member 50 to move into contact with the tire 56, thereby engaging the tire 56. Accordingly, the wheel turn initiator system 42 is configured to transfer the external force 48 to the member 50 (via the bracket 64) and thereby move the member 50 into contact with the wheel and tire assembly 18.

Arrow 74 shows the arcuate path of the member 50 as deformation caused by the external force 48 proceeds. The path 74 may be arcuate (or include a component that is directed inboard) because of the bending of the bumper beam 40 about rail 26, the bending of the guide portion 70 of the bracket 66 relative to the rail 26, or a combination of both. The path 74 forms an angle 76 with a line 77 that is parallel to the centerline of the vehicle 10 and that extends through the tire 56 at the point of initial contact between the tire 56 and the member 50 on the inboard region 52.

The distance 78 between the path 74 and the axis A2 (at the steering pivot) as a result of angle 76 of impacting member 50 creates significant steering moment 80 to turn the forward portion 46 of the wheel and tire assembly 18 inboard (clockwise as seen in FIG. 6). Accordingly the member 50 moves the forward portion 46 of the wheel and tire assembly 18 inboard and, correspondingly, the rearward portion 54 moves outboard, as shown in FIG. 2. Thus, the wheel turn initiator system 42 is configured such that an external force 48 applied to the front end 38 of the vehicle 10 causes the member 50 to engage the wheel and tire assembly 18 and thereby cause the wheel and tire assembly 18 to rotate about the generally vertical axis A2.

Referring again to FIG. 3, the vehicle 10 may include a wheelhouse liner 81 (which may also be referred to as a "wheel well liner"). The wheelhouse liner 81 partially surrounds the wheel and tire assembly 18, thereby separating the wheel and tire assembly 18 from the engine compartment of the vehicle 10. In the event that the vehicle 10 includes a wheelhouse liner 81, the chamfered end 62 of the member 50 may be sufficiently sharp to penetrate the liner 81 as the member 50 moves from the position shown in FIG. 3 to the position shown in FIG. 2. That is, the chamfered end 62 pushes through the material forming the wheelhouse liner 81 so that the chamfered end 62 can then engage the tire 56. In some embodiments, the wheelhouse liner 81 may include a thinner portion or a small hole positioned with respect to the chamfered end 62 so that, in response to the application of the external force 48, the chamfered end is pushed through the thinner portion or small hole of the liner 62 as the member 50 proceeds toward contact with the tire 56.

Figure 7:
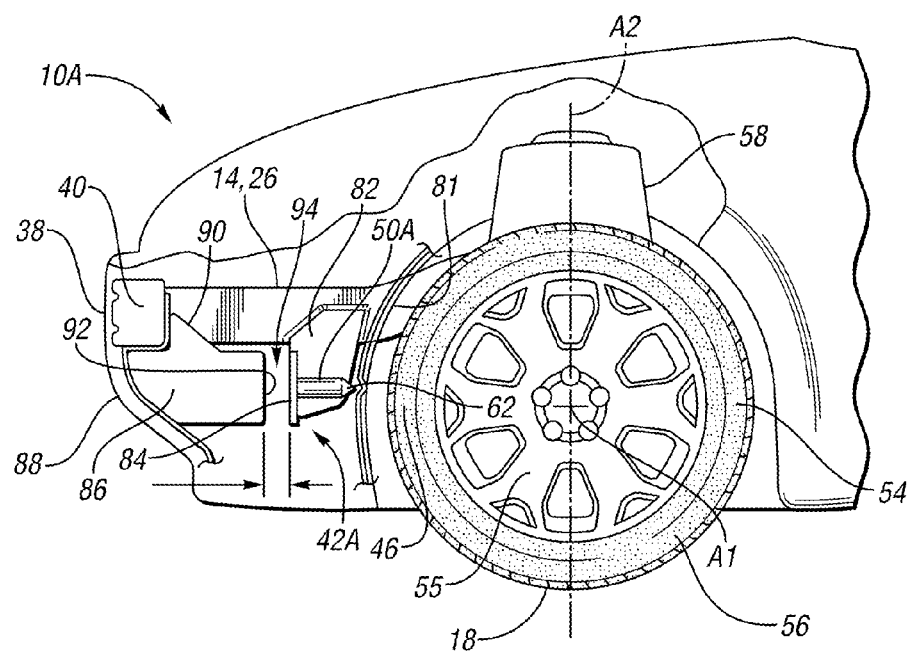
FIG. 7 is a schematic, side view of a portion of a vehicle having another wheel turn initiator configuration.
Figure 8:
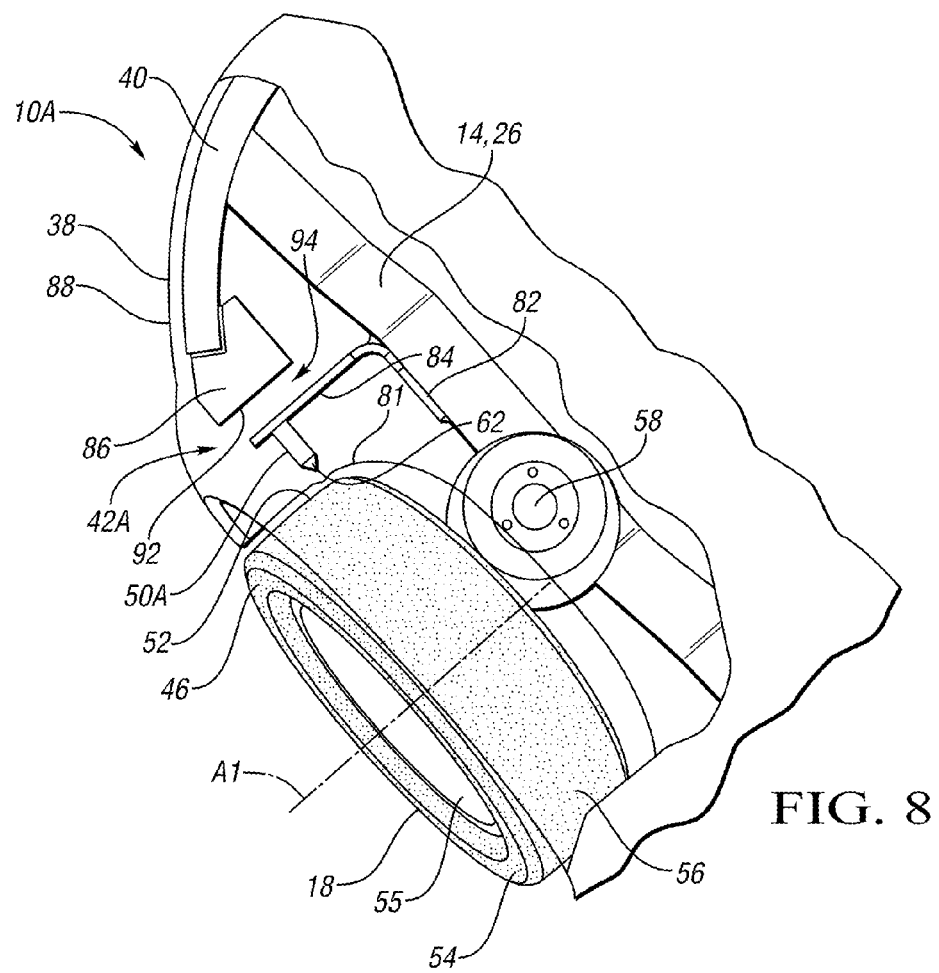
FIG. 8 is a schematic, top view of a portion of the vehicle and wheel turn initiator of FIG. 7.

Referring to FIGS. 7 and 8, vehicle 10A is substantially identical to vehicle 10, but includes an alternative embodiment of the wheel turn initiator system 42A. The wheel turn initiator system 42A includes a member 50A, which is similar to the member 50 shown in FIGS. 1-6. More specifically, member 50A is a rod with a pointed or chamfered end 62 configured to engage the tire 56 in response to an external force of sufficient magnitude being exerted on the front end 38 of the vehicle 10. The member 50A is mounted to the rail 26 via a deformable bracket 82. More specifically, the bracket 82, which may, for example, be stamped steel or aluminum, may be welded or bolted to the rail 26. The bracket 82 includes a cantilever portion 84 that suspends the member 50A directly in front of the inboard region 52 of the forward portion 46 of the wheel and tire assembly 18 at approximately the same height as the axis A1.

The wheel turn initiator system 42A also includes a pusher block 86 that is mounted to the front fascia 88 of the vehicle 10, such as via heat stakes or mechanical fasteners. In the embodiment depicted, the pusher block 86 comprises high-strength injection molded plastic, and may include holes formed therethrough in the fore/aft direction to reduce mass. However, and within the scope of the claims, the pusher block may be any member that transmits force from the front end 38 to the cantilever portion 84 of the bracket 82. For example, a pusher block may be a structural foam block, it may be integrated into the design of the fascia where it has other functions (e.g., the fog lamp housing, or an airflow duct), etc. A portion 90 of the pusher block 86 extends upward to contact the rearward surface of the bumper beam 40. Thus, the external force 48 can be transferred to the pusher block 86 by either the fascia 88 or the bumper beam 40, or by both.

The pusher block 86 extends rearward from the fascia 88 and the bumper beam 40 until the pusher block 86 terminates at a generally flat, vertical surface 92. The surface 92 is directly forward of the cantilever portion 84 of the bracket 82. Before application of the external force to the front end 38 of the vehicle 10A, there is a gap 94 between the rear surface 92 and the cantilever portion 84. This gap 94 is engineered such that external forces below a predetermined magnitude do not cause the member 50A to strike, contact, or otherwise engage the tire 56; i.e., forces below the predetermined magnitude do not cause enough movement of the pusher block 86 to completely traverse the gap 94 and engage the bracket 82.

Figure 9:
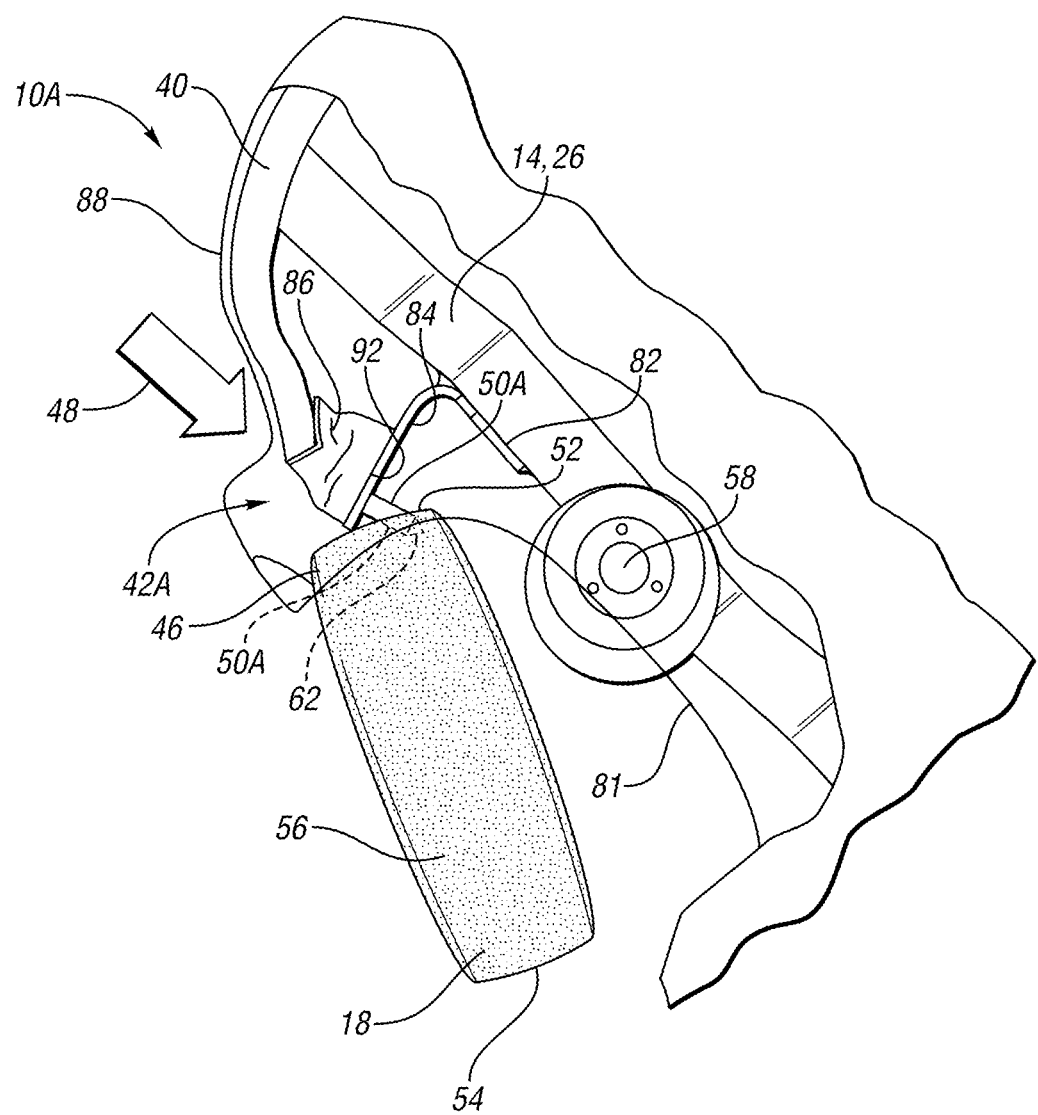
FIG. 9 is a schematic, top view of a portion of the vehicle and wheel turn initiator of FIGS. 7 and 8 during application of an offset external force.

Referring to FIG. 9, an external force 48 above the predetermined magnitude applied to the front end 38 of the vehicle 10A will move the pusher block 86 traverses the gap 94 and the surface 92 pushes against the cantilever portion 84 of the bracket 82, thereby causing deformation of the cantilever portion 84 in the rearward direction. More specifically, in the embodiment depicted, the force from the pusher block 86 causes the cantilever portion 84 to bend near the front rail 26, and thus the member 50A, which is attached to the cantilever portion 84, moves rearward and into engagement with the inboard region 52 of the forward portion 46 of the tire 56.

The pointed end 62 of member 50A engages or otherwise catches the tire 56 and urges the forward portion 46 inboard and, correspondingly, the rearward portion 54 outboard so that the wheel and tire assembly 18 rotates about the generally vertical axis. The bending of the bracket 82 also imparts an inward motion on the member 50A, which produces a steering moment about the wheel and tire assembly 18; in other words, the inward movement of the member 50A during engagement of the member 50A with the wheel and tire assembly 18 produces rotation of the wheel and tire assembly 18 about the generally vertical axis A2.

Figure 10:
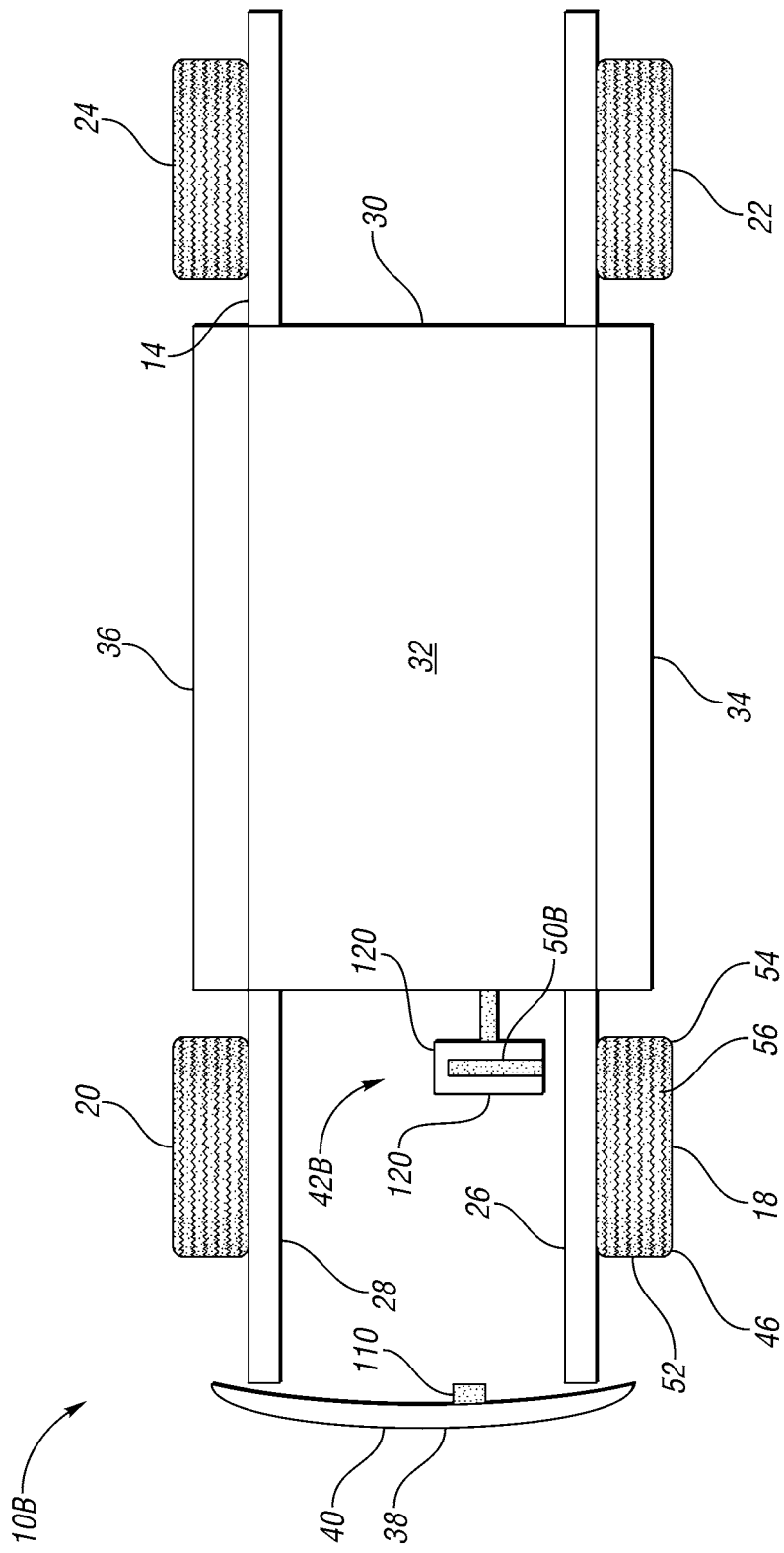
FIG. 10 is a schematic, top view of a vehicle including a front wheel and tire assembly and and yet another wheel turn initiator configuration prior to application of an offset external force to the front end of the vehicle.
Figure 11:
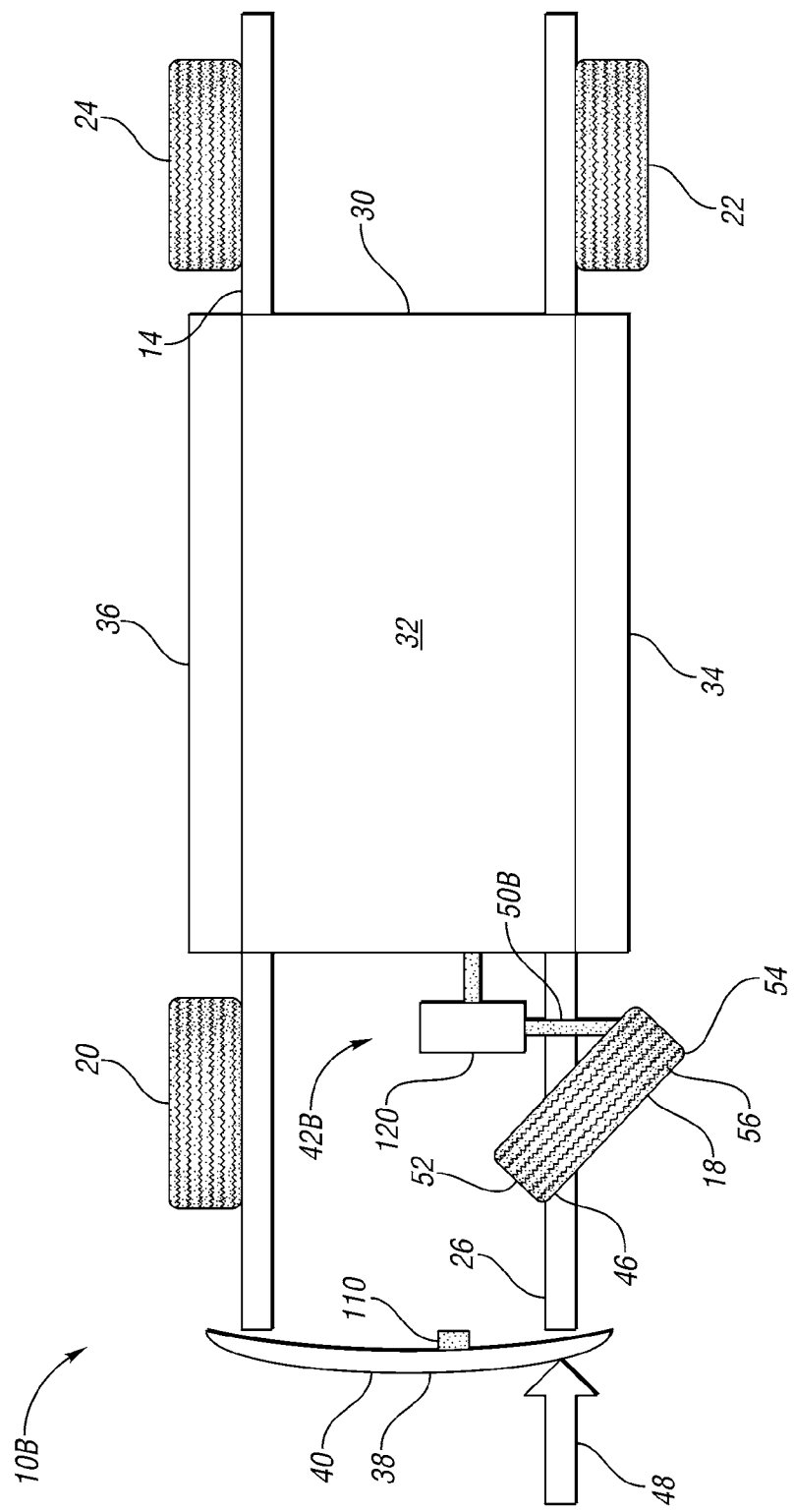
FIG. 11 is a schematic, top view of the vehicle of FIG. 10 after the application of the offset external force.

Referring to FIG. 10, yet another embodiment of a wheel turn initiator is shown at 42B. Vehicle 10B is substantially identical to the vehicle shown at 10 in FIG. 1, with the exception of the wheel turn initiator system 42B. Wheel turn initiator system 42B includes member 50B, which, in the embodiment depicted, is a rod. The member 50B is movably mounted with respect to the frame 14, and is selectively movable between a retracted position, as shown in FIG. 10, and an extended position, as shown in FIG. 11. In the retracted position, the member 50B is inboard of the rearward portion 54 of the wheel and tire assembly 18, and is sufficiently spaced from the wheel and tire assembly 18 so as not to interfere with the rotation of the wheel and tire assembly 18 about its vertical steering axis.

The wheel turn initiator system 42B includes at least one sensor 110 configured to detect an external force applied to the front end 38 of the vehicle 10B, and, more specifically, an offset external force 48 applied to the front end 38 on the side of the wheel and tire assembly 18. For example, the sensor 110 may be an accelerometer. The sensor 110 is operatively connected to an actuator 120. The actuator 120 is operatively connected to the member 50B and is configured to selectively move the member 50B from its retracted position to its extended position.

More specifically, the actuator 120 is configured to move the member 50B from the retracted position to the extended position in response to the sensor 110 detecting the external force 48. For example, sensor 110 may transmit an electronic signal to the actuator 120 when an external force is detected, and the actuator 120 is responsive to the signal by moving the member 50B to its extended position. In the embodiment depicted, the actuator 120 is a pyrotechnic actuator, but other actuator types and configurations may be employed within the scope of the claims.

Referring to FIG. 11, wherein like reference numbers refer to like components from FIGS. 1-10, sensor 110 has detected the presence of the external force 48 being applied to the front end 38 of the vehicle 10B; in response, the sensor 110 has transmitted sensor signals to the actuator 120 indicating that the force 48 is being applied. In response to the sensor signals, the actuator 120 has caused the member 50B to move outboard from the refracted position to the extended position. As the member 50B moves from the retracted to the extended position, the member 50B contacts, and exerts an outboard force on, the inboard side of the wheel and tire assembly 18, rearward of its vertical axis of rotation, and at approximately the height of its horizontal axis of rotation, thereby causing the wheel and tire assembly 18 to rotate about its vertical axis of rotation such that the forward portion 46 of the wheel and tire assembly 18 moves inboard, as shown in FIG. 11.

While the best modes for carrying out the disclosure have been described in detail, those familiar with the art to which this disclosure relates will recognize various alternative designs and embodiments for practicing the disclosure within the scope of the appended claims.

The invention claimed is:

1. A vehicle comprising:
a vehicle frame;
a wheel and tire assembly mounted with respect to the vehicle frame and selectively rotatable about a generally vertical axis; and
a wheel turn initiator system mounted with respect to the frame and having a rod that extends to a distal end, with the distal end facing the wheel and tire assembly;
wherein the wheel turn initiator system is configured such that an external force applied to a front end of the vehicle causes the distal end of the rod to engage the wheel and tire assembly and thereby cause a forward portion of the wheel and tire assembly to move inboard.

2. The vehicle of claim 1, wherein the wheel turn initiator system is configured to transfer the external force to the rod and thereby move the rod into contact with the wheel and tire assembly.

3. The vehicle of claim 2, wherein the wheel turn initiator system is configured such that the external force moves the rod into contact with an inboard region of a forward portion of a tire.

4. The vehicle of claim 2, wherein the wheel turn initiator system includes a guide bracket that is mounted with respect to the frame and that defines a slot that extends transversely with respect to the vehicle;
wherein the rod extends through the slot; and
wherein the slot is sufficiently sized to prevent vertical movement of the rod but permit transverse movement of the rod.

5. The vehicle of claim 4, further comprising a bumper beam;
a mounting bracket that is mounted with respect to the bumper beam such that the bumper beam transfers loads to the mounting bracket; and
wherein the rod is mounted to the bracket.

6. The vehicle of claim 2, further comprising a bracket mounted with respect to the frame, the bracket having a deformable cantilever portion that suspends the rod forward of the wheel and tire assembly;
a pusher block mounted with respect to the frame forward of the bracket such that there is a gap between the pusher block and the cantilever portion, and positioned to receive the external force;
wherein the pusher block traverses the gap and causes the cantilever portion to deform, thereby pushing the rod into engagement with the wheel and tire assembly, when the external force is above a predetermined magnitude.

7. The vehicle of claim 6, further comprising a front fascia that at least partially defines the front end of the vehicle; and
a bumper beam mounted with respect to the frame;
wherein the pusher block is mounted to the front fascia; and
wherein at least a portion of the pusher block is directly rearward of the bumper beam.

8. The vehicle of claim 1, wherein the rod is selectively movable between a retracted position in which the rod does not contact the wheel and tire assembly, and an extended position in which the rod contacts the wheel and tire assembly;

wherein the vehicle further comprises an actuator operatively connected to the rod and configured to move the rod from the retracted position to the extended position.

9. The vehicle of claim 8, further comprising a sensor mounted with respect to the frame and configured to detect the application of the external force to the front end of the vehicle;

wherein the actuator is operatively connected to the sensor such that the actuator moves the rod from the retracted position to the extended position if the sensor detects the external force.

10. The vehicle of claim 9, wherein the rod contacts an inboard side of the wheel and tire assembly rearward of the generally vertical axis.

11. The vehicle of claim 9, wherein the actuator is a pyrotechnic actuator.

12. A vehicle comprising:
a vehicle frame;
a wheel and tire assembly mounted with respect to the vehicle frame and selectively rotatable about a generally vertical axis; and
a wheel turn initiator system mounted with respect to the frame and having a member;

wherein the wheel turn initiator system is configured such that an external force applied to a front end of the vehicle causes the member to engage the wheel and tire assembly and thereby cause the wheel and tire assembly to rotate about the axis;

wherein the wheel turn initiator system is configured to transfer the external force to the member and thereby move the member into contact with the wheel and tire assembly;

wherein the wheel turn initiator system includes a guide bracket that is mounted with respect to the frame and that defines a slot that extends transversely with respect to the vehicle;

wherein the member extends through the slot; and wherein the slot is sufficiently sized to prevent vertical movement of the member but permit transverse movement of the member.

13. The vehicle of claim 12, further comprising a bumper beam;
a mounting bracket that is mounted with respect to the bumper beam such that the bumper beam transfers loads to the mounting bracket; and
wherein the member is mounted to the bracket.

* * * * *